Nov. 9, 1954 U. KOPSCH 2,693,998
MANUFACTURE OF HYDROGEN PEROXIDE
Filed Jan. 21, 1952
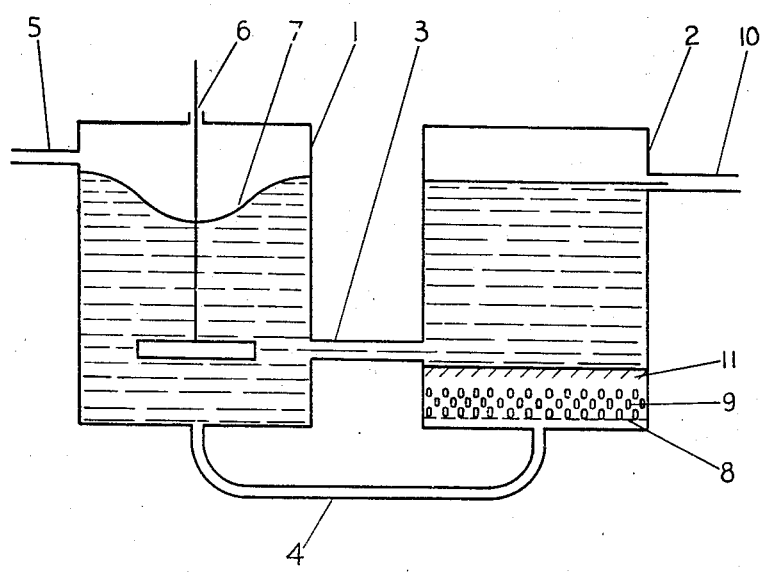
INVENTOR
ULRICH KOPSCH
Cushman, Darby & Cushman
ATTORNEYS

United States Patent Office 2,693,998
Patented Nov. 9, 1954

2,693,998

MANUFACTURE OF HYDROGEN PEROXIDE

Ulrich Kopsch, Widnes, England, assignor to Imperial Chemical Industries Limited, a corporation of Great Britain Application January 21, 1952, Serial No. 267,403

Claims priority, application Great Britain February 2, 1951

4 Claims. (Cl. 23—207)

This invention relates to the manufacture of peroxides and more particularly to an improved process for the manufacture of hydrogen peroxide.

It is known that alkali metal peroxides and hydrogen peroxide may be prepared by the autoxidation in a cyclic process of organic compounds such as hydrazobenzene or anthrahydroquinone derivatives dissolved in organic solvents. The cycle entails alternate oxidation of the organic compound with oxygen and reduction of the product to the original organic compound after the peroxides formed in the oxidation process have been removed.

It has been proposed also to carry out the reduction process with hydrogen in the presence of a catalyst as for example nickel, but in such cases it has been found that the efficiency of the catalyst is much reduced as the cyclic process is continued. This is due primarily to the presence in the reaction liquid of dissolved oxygen and residual hydrogen peroxide after the bulk of the hydrogen peroxide has been removed in the extraction process. Thus in the so-called ethyl anthraquinone process for the manufacture of hydrogen peroxide an organic liquid consisting of ethyl anthraquinone dissolved in a mixed solvent containing one or more higher molecular weight alcohols and a liquid aromatic hydrocarbon is reduced catalytically with hydrogen to give a solution containing ethyl anthrahydroquinone. This is subsequently oxidised with an oxygen bearing gas in order to regenerate ethyl anthraquinone and simultaneously produces for each molecule of ethyl anthrahydroquinone oxidised one molecule of hydrogen peroxide as product. The bulk of the hydrogen peroxide dissolved in the organic phase is then isolated by extracting with water while the organic phase so denuded still retains a small amount of hydrogen peroxide, generally of the order of 0.01% by weight together with a quantity of dissolved oxygen.

In U. S. Patent No. 2,369,912 there is described a method of removing these remainders of hydrogen peroxide and oxygen in the reaction liquid. The method so described is to treat the reaction liquid prior to the reduction with readily oxidisable substances which react with the hydrogen peroxide and if possible with the dissolved oxygen. Suitable compounds for this purpose are manganous and ferrous compounds such as ferrous sulphate solutions or alkaline solutions or suspensions containing ferrous hydroxide.

In some cases the remainders of peroxide may be removed by treating the reaction liquid with substances which bind peroxides such as caustic soda, sodium metaborate or sodium carbonate.

Another method of removing residual peroxide is to treat the reaction liquid before reduction with a catalyst which effects decomposition of the peroxides. Many heavy metals such as iron, nickel, copper, silver and noble metals such as platinum and palladium, act in this way as do also metal oxides or hydroxides.

I have now found that an improved method of removing the residual hydrogen peroxide from the denuded organic phase as referred to hereinbefore is to extract the hydrogen peroxide from the said organic phase with an aqueous phase, decompose the extracted hydrogen peroxide in the aqueous phase by means of a solid catalyst and to return the treated aqueous phase to the extraction apparatus for contact with a further portion of the denuded organic phase.

According to the present invention, therefore, a process for the manufacture of hydrogen peroxide by the alternate reduction and oxidation of an anthraquinone derivative dissolved in an organic solvent in which process the organic solution is extracted with water after the oxidation step in each cycle to recover the main bulk of hydrogen peroxide, includes the steps of removing residual hydrogen peroxide from the organic solution by extracting with an aqueous phase after the bulk of the hydrogen peroxide has been removed, decomposing the extracted residual hydrogen peroxide in the aqueous phase by means of a solid catalyst and returning the treated aqueous phase for contact with a further portion of the organic solution from which the bulk of the hydrogen peroxide has been removed.

By the method of my invention it is to be noted that a continuous operation may be carried out in which the aqueous phase is not discarded but fed back to the reaction liquid thus ensuring that there is no loss of solvent resulting from its solubility in the aqueous phase. After removal of the residual hydrogen peroxide the solvent may also be degassed to free it of dissolved oxygen either by blowing hydrogen through the solvent or else by submitting the solvent to reduced pressure.

Any of the known hydrogen peroxide decomposition catalysts may be used but for preference we employ a catalyst consisting of granulated alumina impregnated with silver nitrate and reduced to the metallic state by any of the known methods such as for example contacting with aqueous formic acid or by heating to approximately 500° C., in an atmosphere of hydrogen.

The aqueous phase for extracting the residual hydrogen peroxide may consist of water alone or dilute aqueous hydrogen peroxide but we prefer to employ an aqueous phase maintained at a pH of not less than (10) suitably by additions of alkali or alkali carbonates.

There are many advantages in the catalytic decomposition of residual hydrogen peroxide in the aqueous phase as in the method of the present invention compared with the catalytic decomposition effected in the organic liquid phase.

In the first place, the partition coefficient of hydrogen peroxide between organic solution and water for most systems of practical interest is found to lie in the range 40—200 in favour of the aqueous phase, so that for a given residual concentration of $H_2O_2$ in the organic phase, the concentration in the aqueous extract will be very much higher. Since it is found that the rate of decomposition of hydrogen peroxide by a given weight of catalyst is approximately proportional to the concentration of the hydrogen peroxide it is possible to employ much smaller quantities of catalyst than would be required for decomposition in tthe organic phase. This advantage is further enhanced if the aqueous phase is rendered slightly alkaline.

Furthermore, if faulty operation in the main extraction stage of hydrogen peroxide manufacture should result in an unusually large proportion of hydrogen peroxide remaining in the organic liquid the presence of a considerable quantity of aqueous phase would act as a sink for the residual peroxide.

A further advantage of the process of the invention is apparent when it is operated in a continuous manner, namely—that the organic solution is not held up in the catalyst bed and hence the initial cost of charging a plant with organic solution is low compared with the cost of a process in which the decomposition is effected in the organic phase. Moreover, traces of organic acids which might accumulate as by-products in the solvent are automatically extracted if the extracting phase is an aqueous alkaline solution.

The invention may be performed batchwise or in a continuous operation. For carrying out the continuous operation a suitable apparatus for this purpose consists of a container fitted with a stirrer which produces a vortex when liquid is vigorously stirred within. This container is connected by means of two pipes to a second container filled partly with the catalyst. The connecting pipes are so arranged that when stirring is commenced the differential pressure produced by the vortex initiates and maintains a rapid circulation of liquid through both containers.

Both containers are first filled with water, and the organic solution is fed continuously into the stirred container where the hydrogen peroxide distributes itself between the organic and aqueous phases; the agitation caused by the stirring in the stirred container ensures that the two immiscible phases are brought into good contact with each other so that the hydrogen peroxide is permitted to distribute itself between these phases in accordance with its partition coefficient.

The suspension of the two liquids is transported through the upper pipe to the second container where separation of the phases occurs, the lighter organic phase leaving the second container by an overflow while the heavier aqueous phase passes through the catalyst bed and is recycled through the lower tube to the stirred container.

The process of the invention will now be more particularly described with reference to the attached drawing which represents one suitable form of apparatus with which my process may be effected in continuous operation.

In the drawing 1 and 2 are containing vessels suitably constructed of stainless steel and connected to each other by two tubes 3 and 4.

Organic solvent from which the bulk of the hydrogen peroxide has been removed is fed continuously into the containing vessel 1 through the inlet 5. The liquid in the containing vessel 1 is stirred continuously by means of the stirrer and producing a vortex 7 which initiates continuous circulation of liquid from the containing vessel 1, to containing vessel 2 through the connecting tube 3 and from the containing vessel 2 to containing vessel 1 through the connecting tube 4.

In the lower portion of the containing vessel 2 there is located a catalyst bed 8 which comprises a wire mesh platform—supporting granules of the catalyst 9.

The containers are both initially filled with water and the organic phase entering at inlet 5 is thoroughly mixed with the water in the containing vessel 1 so that the residual hydrogen peroxide in the organic phase is for the most part extracted by the water.

The suspension of the two liquids is transported from the containing vessel 1 to the containing vessel 2 where separation of the aqueous and organic phases occurs. The lighter organic phase now denuded of residual hydrogen peroxide overflows through the exit tube 10 from which it is fed back to take part in the primary process while the heavier aqueous phase 11 flowing downwards through the catalyst bed 8 is freed of its hydrogen peroxide content and returned through the connecting tube 4 to the containing vessel 1.

The following example illustrates but does not limit my invention:

*Example*

In an apparatus for the production of hydrogen peroxide by the anthraquinone process, a solution containing 8% by weight of 2-ethyl anthraquinone, 37% by weight of secondary octyl alcohol, and 55% by weight of xylene was employed as the working solution. Apparatus was provided for removal of the residual hydrogen peroxide from the denuded working solution according to the principles of the present invention, and comprised a stirred vessel of 100 litres capacity in which the denuded solution was contacted with the aqueous phase, and a second vessel of similar size which served as a separator and catalyst container. The two vessels were connected by a pipe passing from the side of the stirred vessel to the side of the separator, conveying the mixed organic and aqueous liquids into the separator, and also by a second pipe from the bottom of the separator below the catalyst layer to the centre of the bottom of the stirred vessel. This pipe conveyed the treated aqueous phase back to the stirred vessel under the suction of the vortex produced by the stirrer.

The organic phase entered the stirred vessel at the rate of 170 kg. per hour, and contained 0.1% by weight of hydrogen peroxide. The aqueous phase recycled to the stirred vessel consisted of water containing .036% by weight of hydrogen peroxide and entered at the rate of 420 kg./hr. In the separator the liquids formed a lighter organic phase, containing 0.002% by weight of hydrogen peroxide, which overflowed at the top of the separator, and a heavier aqueous layer containing 0.076% by weight of hydrogen peroxide, which passed downwards through the catalyst bed, and returned to the stirred vessel. The catalyst bed contained 5.6 litres of catalyst. This had been prepared by immersing activated alumina of size grading ¼ in. to ⅛ in. in 5% by weight silver nitrate solution, draining and drying in an oven at 120° C., then treated with hydrogen at 500–600° C., and finally washing thoroughly with water.

What I claim is:

1. In a process for the manufacture of hydrogen peroxide by the alternate reduction and oxidation of an anthraquinone derivative dissolved in an organic solvent, in which process the organic solution of the anthraquinone derivative is extracted with water after the oxidation step in each cycle to recover the main bulk of the hydrogen peroxide, the steps which comprise removing the residual hydrogen peroxide from the said organic solution by extracting with an aqueous phase after the bulk of the hydrogen peroxide has been removed, decomposing the extracted residual hydrogen peroxide in the aqueous phase by means of a hydrogen peroxide decomposition catalyst and returning the treated aqueous phase for contact with a further portion of the organic solution from which the bulk of the hydrogen peroxide has been removed.

2. A process as claimed in claim 1 in which the hydrogen peroxide decomposition catalyst employed consists of granulated alumina that is impregnated with silver nitrate, the said silver nitrate having been reduced to the metallic silver state.

3. A process as claimed in claim 1 in which the aqueous phase is maintained at a pH value of not less than 10 during the extraction.

4. A process as claimed in claim 1 in which the steps are performed in continuous operation.

References Cited in the file of this patent

UNITED STATES PATENTS

| Number | Name | Date |
|---|---|---|
| 2,369,912 | Pfeiderer et al. | Feb. 20, 1945 |